United States Patent [19]

Niebruegge et al.

[11] Patent Number: 4,731,165

[45] Date of Patent: Mar. 15, 1988

[54] METHOD OF DECOLORATION OF TRIETHYLENETETRAMINE USING SULFONIC ACID ION EXCHANGE RESINS

[75] Inventors: Dennis L. Niebruegge, Humble, Tex.; Timothy J. Dempsey, Crossett, Ark.; S. Bennett Willis, Lake Jackson, Tex.

[73] Assignee: The Dow Chemical Company, Midland, Mich.

[21] Appl. No.: 808,983

[22] Filed: Dec. 16, 1985

[51] Int. Cl.$^4$ .................. B01D 3/34; C07C 85/26
[52] U.S. Cl. ........................ 203/29; 203/38; 203/91; 564/498
[58] Field of Search .............. 203/6, 29, 38, 41, 34, 203/91; 564/498, 497, 499; 521/25

[56] References Cited

U.S. PATENT DOCUMENTS

| | | | |
|---|---|---|---|
| 2,622,097 | 12/1952 | Osborne | 521/25 |
| 2,911,362 | 11/1959 | Wheaton | 564/498 |
| 3,217,026 | 11/1965 | Vertnik et al. | 564/498 |
| 3,595,921 | 7/1971 | Pitts | 564/498 |
| 3,723,529 | 3/1973 | Pitts et al. | 564/498 |
| 3,819,710 | 6/1974 | Jordan | 564/497 |
| 4,039,428 | 8/1977 | Wei | 203/41 |
| 4,379,024 | 4/1983 | Gardner | 203/6 |
| 4,570,019 | 2/1986 | Gibson | 564/498 |

FOREIGN PATENT DOCUMENTS 150075 7/1985 European Pat. Off. ............ 564/498

*Primary Examiner*—Wilbur Bascomb
*Attorney, Agent, or Firm*—Gunn, Lee & Jackson

[57] ABSTRACT

A process of decoloring crude triethylenetetramine (TETA) is disclosed. In the disclosed and preferred procedure, a sulfonic acid ion exchange resin acts on the crude TETA to enable subsequent distillation at elevated temperature to obtain decolored TETA.

14 Claims, No Drawings

METHOD OF DECOLORATION OF TRIETHYLENETETRAMINE USING SULFONIC ACID ION EXCHANGE RESINS

This invention deals with the decoloration of triethylenetetramine (TETA) by treatment of te crude TETA with a sulfonic acid ion exchange resin followed by vacuum distillation to yield a decolored TETA product. In particular, a temperature stable, insoluble resin acts catalytically on the crude commercial amine so that distillation at elevated temperature produces a material which is more attractive, and more marketable.

The background of the invention exists in the need to find uses and markets (e.g., common industrial products and by-products for triethylenetetramine (TETA) and its relatives—ethylenediamine, piperazine, and other alkylamines. TETA and related amines admit to discoloration in the context of industrial mixtures and by-products. Because such impure mixtures and materials suffer a reduction in chemical and commercial utility, it is desirable to separate, purify, and decolor such mixtures and materials.

Price and purity are the most important characteristics of a chemical's marketability to a potential customer, but while price is essentially quantitative, purity has both quantitative and qualitative aspects. Small amounts of an objectionable contaminant may limit marketability far more than relatively large quantities of benign impurities. Thus a laboratory chemist may not be interested in the physical appearance of a solvent as long as it has less than 1 ppm of a particular analyte; consumers in the general public, and suppliers to them, may be more concerned in having a white or colorless material. Sources of color contamination include metals and metal compounds, as well as conjugated organic compounds with electron delocalization. Therefore, the decoloration process must act by a mechanism which depends on the color source: conjugated systems like the terpenoids may be altered by oxidative attack, or by reduction to a more saturated form, while metal contaminants may often be removed by chelatin or complexation methods.

Decoloration is thus a general proposition which can take many specific forms, depending on the color source. Addition of a masking agent with its own stronger color will often be appropriate. For example, tire rubber gets it black color from addition of large amounts of carbon black to the polymer; white paint gets its color from large amounts of titanium dioxide, a white power. But when one desires to improve the color of the starting material without adding another compound, it becomes necessary to remove or destroy the color source. Both techniques may be accomplished chemically by direct action on the colorant so as to separate it from the material of interest or to change it to a less objectionable form (e.g., colorless, white, or the same color as the material of interest). The ease and efficiency of such action will impact directly on the quantitative and qualitative purity of the material, as well as on the attendant price.

The need to find such decoloration methods is not new, and many processes are known to aid in meeting that need. Elementary oxidation and reduction techniques have long been available for the modification of discolorants and contaminants into colorless or easily removable forms. But treatment of liquid phase materials poses more challenging problems with respect to separations and solubility. The subject of the invention is TETA, a chemical whose propensity for discoloration has occupied the mind of previous investigations.

U.S. Pat. No. 3,755,447 describes a method of purifying polyalkylene polyamines by complexation of the amine with an inorganic salt such as sodium bromide. The complexation is followed by separation of the salt chelate from the original liquor and then destabilization of the comlex yielding a purer amine material. The patent is based on a recognition of the roles of the lattice energy of the salt and the ring size of the complex in determining complex stability. Said invention improved on the prior art by increasing the complexing selectivity available and by making the process possible in aprotic media.

U.S. Pat. No. 3,217,026 involves another liquid-liquid extraction application to polymeric amines. In this reference, the invention purports to remove color and metal contamination; the color may in fact stem from that contamination, as copper and chromium metals play catalytic roles in the synthesis of the amines. The treatment process requires the simultaneous use of acid clays and a mild ammonia solution for the decoloration of the amines with the amine being contacted first by the acid clay and then extracted with the ammonia solution. The resulting organic phase is less dense than the aqueous layer and contains the purified amine.

Both of the above patents testify to the need for an efficient means of improving the quality of crude TETA. Neither patent appears to comprise a true catalytic operation, and each of them involves classical liquid-liquid extraction techniques. The use of acid clays in U.S. Pat. No. 3,217,026 appears to involve exploitation of the clays' known absorbent properties rather than any catalytic characteristics. Liquid-liquid techniques may of course be entirely suitable for laboratory and small scale operations, but it cannot be denied that large scale industrial operations would benefit greatly from use of heterogeneous catalytic processes which would avoid the comparative messiness of salt complexation and ammonia treatment methods. Indeed the ideal process would perform the amine treatment with an insoluble, solid catalyst which could be easily separated from the mixture and recycled for repeated use, and needing less catalyst as an ideal.

The present invention comprises the vacuum distillation of TETA in the presence of an acidified ion exchange resin which operates catalytically to reduce coloration of the crude TETA. In particular, by contacting crude TETA with the acid form of such a resin, said resin having been acidified to the hydrogen form, it is possible to obtain very low APHA color values of the distillate product. The appeal of this invention lies in the small amount of resin needed, the easy separation of the resin from the mixture, and thus the resulting applicability of the process to an industrial context.

Furthermore, the eventual end product of the refined TETA will be more than aesthetically improved by having less color and color contaminants—there will be no traces of the color reducing agents either. Herein lies an unobvious improvement over treatment with liquid-liquid processes: one need not worry about residual metal salts, complexes, etc., or traces of whatever unknown chemical a previous supplier may have employed in decoloration. Nor is there any worry about contamination of the bottoms in the distillation column by unpleasant compounds which are difficult to deal with (amine hydrochlorides being the obvious example). On the contrary, this invention lends itself to reactor configurations of the user's choice with no such contamination.

An elegant application of the present invention involves the use of DuPont's Nafion ion exchange resin as the catalyst. This is a trademarked product of DuPont, namely perfluorosulfonic acid in specified forms. The fluorinated alkylsulfonic acid polymer has membrane applications, but also works well here as a powder. Nafion powder 501 was acidified as follows: 50 grams of the resin was placed in a column with 10% nitric acid, thus forming a slurry. 2000 ml of the acid dripped through the column over several hours, after which the contents of the column were rinsed with 4000 ml of distilled water. The rinsed resin was dried overnight in a vacuum over at 50° C. The acidified Nafion was used in several procedures. The following examples illustrate the present invention.

EXAMPLE I 40 grams of the acidified Nafion resin and 960 ml of crude TETA were placed into a 10-tray Oldershaw distillation column apparatus after mechanical stirring in a pot. The temperature of the mixture in the column was 155° C., the pressure about 2 mm Hg, and the column reflux ratio about 3/1. After 30 minutes of refluxing in the column, overhead product was taken off the column for color inspection. The fractions tested had the following color values:

| Volume of Product (ml) | APHA Color |
| --- | --- |
| 110 | 15 |
| 150 | 10 |
| 200 | 0 |

EXAMPLE II

Dowex* MSC-1 ion exchange resin, the acidified form, was used instead of Nafion 501 as the catalyst. Because this resin is not rated for temperatures as high as 155° C., the mixture was only heated to 140° C. and the resin then removed. The vacuum distillation of Example I followed, yielding a decolored TETA product; the decoloration was, of course, less pronounced than Example I, probably because the catalyst of Example I was able to contact the TETA at high temperature up until the instant of distillation.
*Trademark of The Dow Chemical Company; MSC-1 is a macroporous strong acid cation exchange resin.

In principle, any ion exchange resin which contains the SO$_3$H functionality should catalyze the process. Naturally, the best such resin should be solid, insoluble, and temperature stable in order to survive the distillation, and have a high density of the sulfonic acid groups. Below 140° C., the process drops markedly in effect; and as Nafion's temperature stability places an effective ceiling of 200° C. on the process, the permissible temperature range is thus 140°-200° C. Accordingly, based on the temperature-vapor pressure relation for TETA, a permissible pressure range is defined. That range has been found experimentally to be about 1-150 mm Hg, with the low pressure corresponding to the low temperature and vice versa. In general, the Nafion catalyzed product has an APHA color value of 20 or below, while the color obtained from Example II is more typically between 100 and 150 as a result of catalyst temperature limitations. Nor is there any reason to limit the invention to TETA alone, as the entire class of polyalkylene polyamines (PAPA) can be successfully treatable by the present process as described herein for TETA.

Continuous operation requires downstream catalyst recovery; one acceptable catalyst recovery procedure is filtration to enable recycling of the catalyst. While the foregoing is directed to the preferred embodiments, the scope of the present disclosure is determined by the claims which follow.

We claim:
1. A method of reducing triethylenetetramine (TETA) coloration comprising the steps of:
 (a) heating TETA to selected pressures and temperatures;
 (b) conducting the heating step in the presence of an ion exchange resin having a sulfonic acid functional group wherein the resin remains stable at the temperatures of the heating step; and
 (c) after a period of heating the TETA in the presence of the resin, then distilling the TETA to recover TETA with reduced coloration.

2. The method of claim 1 wherein the step of heating is accomplished sufficiently above 140° C. to obtain a flow of TETA with APHA color measuring below about 20 upon distillation.

3. The method of claim 2 wherein distillation pressure is in the range of 1 to 150 mm of mercury during the distillation step, and wherein the distillation temperature exceeds about 155° C. and is limited by the temperature degradation limit of the resin.

4. The method of claim 3 wherein said resin is mixed in a distillation apparatus in an effective ratio with TETA in said distillation apparatus to catalytically destroy color agents in the TETA.

5. The method of claim 4 wherein the resin is treated with a strong acid before use.

6. The method of claim 1 wherein the resin is a powder treated with a strong acid before use.

7. The method of claim 6 wherein the distillation step is conducted at pressures below about 150 mm mercury.

8. The method of claim 1 wherein said resin is first prepared by an acid wash followed by a rinse and drying.

9. The method of claim 1 wherein TETA is separated from the resin and then distilled.

10. A method of reducing polyalkylene polyamine (PAPA) coloration comprising the steps of:
 (a) heating PAPA to selected pressures and temperatures;
 (b) conducting the heating step in the presence of an ion exchange resin having a sulfonic acid functional group wherein the resin remains stable at the temperatures of the heating step; and
 (c) after a period of heating the PAPA in the presence of the resin, then distilling the PAPA to recover PAPA with reduced coloration.

11. The method of claim 10 wherein the step of heating is accomplished sufficiently above 140° C. to obtain a flow of PAPA with APHA color measuring below about 150 upon distillation.

12. The method of claim 11 wherein distillation pressure is in the range of 1 to 150 mm of mercury during the distillation step, and wherein the temperature exceeds about 155° C. and is limited by the distillation temperature degradation limit of the resin.

13. The method of claim 12 wherein said resin is mixed in a distillation apparatus in an effective ratio with PAPA in said distillation apparatus to catalytically destroy color agents in the PAPA.

14. The method of claim 13 wherein the resin is Nafion powder treated with a strong acid before use.

* * * * *